US010839108B2

(12) United States Patent
Awan et al.

(10) Patent No.: US 10,839,108 B2
(45) Date of Patent: Nov. 17, 2020

(54) STORAGE DEVICE AND VERIFICATION THEREOF

(71) Applicant: Seagate Technology LLC, Cupertino, CA (US)

(72) Inventors: Muhammad Mohsin Awan, Lafayette, CO (US); David Michael Seesdorf, Broomfield, CO (US); Kevin Gautam Sternberg, Longmont, CO (US); Saheb Biswas, Boulder, CO (US); Anthony Ramon Duran, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 163 days.

(21) Appl. No.: 15/991,959

(22) Filed: May 29, 2018

(65) Prior Publication Data

US 2019/0370501 A1  Dec. 5, 2019

(51) Int. Cl.
*G06F 21/73* (2013.01)
*H04L 9/06* (2006.01)
*H04L 9/08* (2006.01)

(52) U.S. Cl.
CPC ............ *G06F 21/73* (2013.01); *H04L 9/0637* (2013.01); *H04L 9/0877* (2013.01); *H04L 2209/127* (2013.01); *H04L 2209/38* (2013.01)

(58) Field of Classification Search
CPC ..... G06F 21/44–445; G06F 21/64–645; G06F 21/73; H04L 9/0637; H04L 9/0877; H04L 9/3236–9/3239; H04L 2209/127; H04L 2209/38
See application file for complete search history.

(56) References Cited

U.S. PATENT DOCUMENTS

| | | |
|---|---|---|
| 7,055,029 B2 | 5/2006 | Collins et al. |
| 7,322,042 B2 | 1/2008 | Srinivasan et al. |
| 7,457,168 B2 | 11/2008 | Jeong et al. |
| 7,581,242 B1 | 8/2009 | Oget et al. |
| 7,768,835 B2 | 8/2010 | Goda |
| 8,533,856 B2 | 9/2013 | Estakhri et al. |
| 8,726,407 B2 | 5/2014 | Etchegoyen |
| 9,343,160 B1 | 5/2016 | Dutta et al. |
| 9,478,296 B2 | 10/2016 | Nam |
| 9,984,256 B2 | 5/2018 | Liu et al. |
| 10,484,371 B2 | 11/2019 | Ellis |
| 2012/0208619 A1* | 8/2012 | Canterbury ........... G06F 21/572 463/25 |
| 2018/0343126 A1* | 11/2018 | Fallah ..................... H04L 9/30 |

\* cited by examiner

*Primary Examiner* — Kevin Bechtel
(74) *Attorney, Agent, or Firm* — Hall Estill Attorneys at Law

(57) ABSTRACT

A method comprises generating a first block of a block chain and generating a second block of the block chain. The first block is associated with a first component of a storage device. The first block is generated when the first component is manufactured. The second block is associated with a second component of the storage device. The second block is generated when the second component is manufactured.

18 Claims, 5 Drawing Sheets

STORAGE DEVICE AND VERIFICATION THEREOF

SUMMARY

Provided herein is a system that includes generating a first block of a block chain and generating a second block of the block chain. The first block is associated with a first component of a storage device. The first block is generated when the first component is manufactured. The second block is associated with a second component of the storage device. The second block is generated when the second component is manufactured.

These and other features and advantages will be apparent from a reading of the following detailed description.

DESCRIPTION

Figure 1:
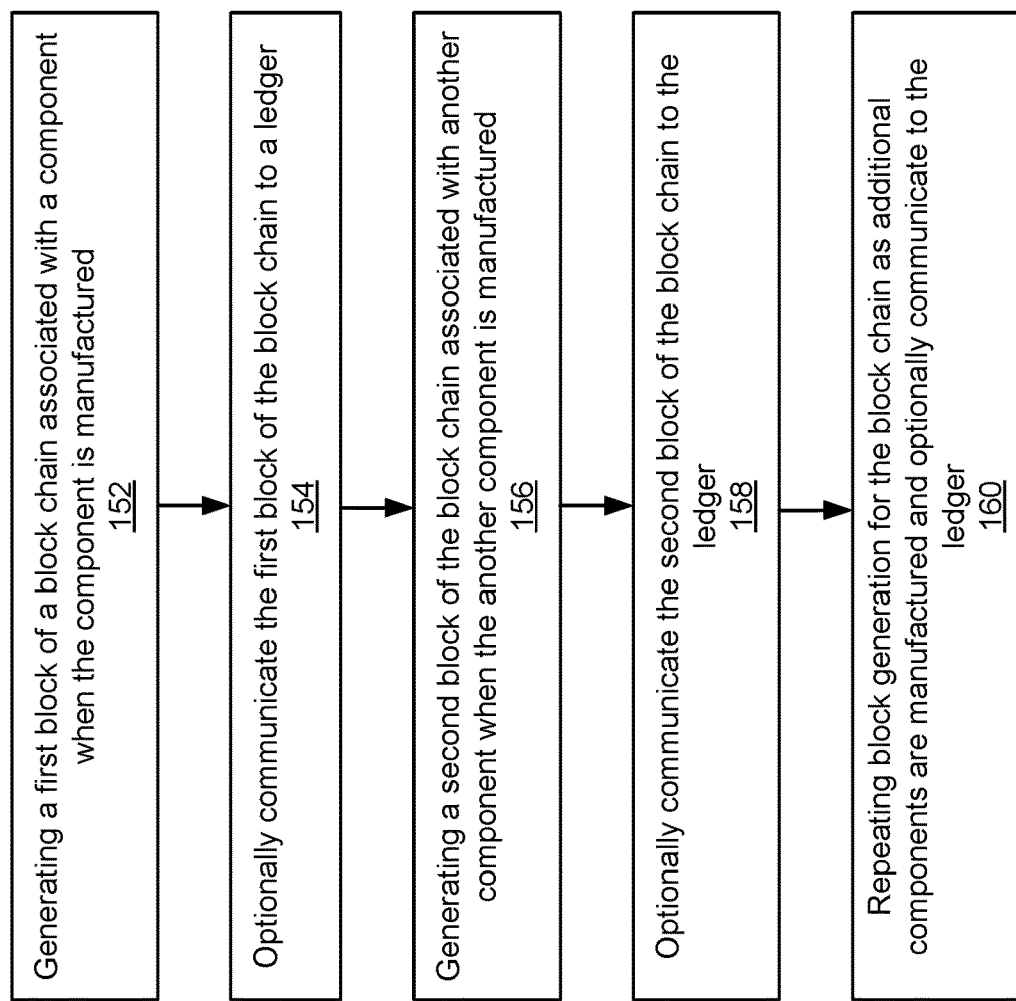
FIG. 1 shows manufacturing a storage device and proof of origin according to one aspect of the present embodiments.
Figure 1:
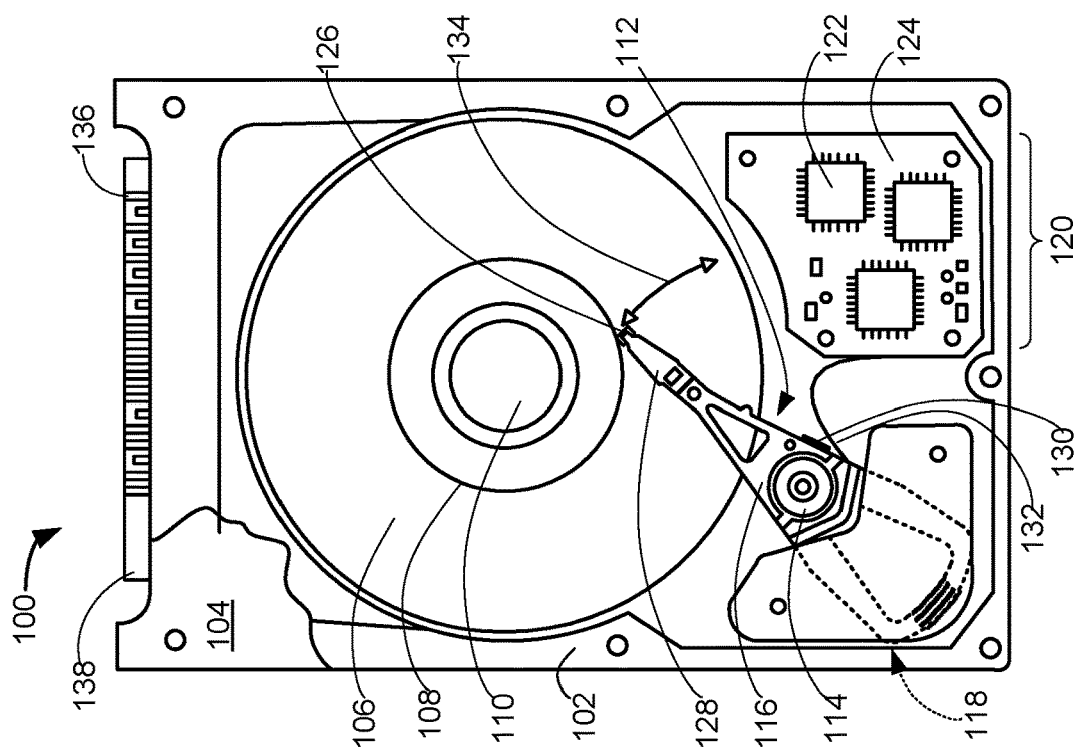

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device or a processor. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "decrypting," "encrypting," "processing," "updating," "instantiating," "communicating," "comparing," "erasing," "issuing," "locking," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated that present systems and methods can be implemented in a variety of architectures and configurations. For example, present systems and methods can be implemented as part of a distributed computing environment, a cloud computing environment, a client server environment, hard drive, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

There has been a growing need for determining authenticity of a device (proof of authentic hardware) and/or its components (proof of component origins). For example, a need has arisen to determine whether a storage device, e.g., hard drive, solid state drive, etc., is authentic and whether its supply chain is secure by publicly determining that the product was manufactured by the manufacturer that claims that it manufactured the product. Authenticating a device and/or components thereof has become more important recently, given an increase in security breach associated with a number of different electronic manufacturers.

Moreover, an ever increasing use of sensitive data, e.g., in military application, etc., has increased the need to successfully erase data/content from a storage device when the data is no longer needed or when the data has been compromised. Thus, there is a need to determine whether erasure of data from the storage device has been successful.

It is further appreciated that many regulations, HIPAA, etc., require the storage device to operate in a particular mode, e.g., self-encrypted drive (SED), federal information processing standard (FIPS), etc. In other words, there is a need to ensure a particular functionality for the storage device. It is further appreciated that there is a need to determine whether the electronic device, e.g., storage device, is using a particular, e.g., latest, hardware/software. For example, it is desirable to determine whether the device, e.g., storage device, is using the latest firmware, and to take additional security measures, e.g., locking down the device such that its content becomes inaccessible, if the firmware is determined to be unauthentic.

It is appreciated while the embodiments are described with respect to a storage device and in particular hard drive, the embodiments are not limited thereto. For example, the embodiments are equally applicable to other electronic devices, e.g., solid state drive, or even non-storage devices.

Referring now to FIG. 1, manufacturing a storage device and proof of origin according to one aspect of the present embodiments is shown. A disk drive 100 generally includes a base plate 102 and a cover 104 that may be disposed on the base plate 102 to define an enclosed housing for various disk drive components. The disk drive 100 includes one or more data storage disks 106 of computer-readable data storage media. Typically, both of the major surfaces of each data storage disk 106 include a plurality of concentrically disposed tracks for data storage purposes. Each data storage disk 106 is mounted on a hub 108, which in turn is rotatably interconnected with the base plate 102 and/or cover 104. Multiple data storage disks 106 are typically mounted in vertically spaced and parallel relation on the hub 108. A spindle motor 110 rotates the data storage disks 106.

The disk drive 100 also includes an actuator arm assembly 112 that pivots about a pivot bearing 114, which in turn is rotatably supported by the base plate 102 and/or cover 104. The actuator arm assembly 112 includes one or more individual rigid actuator arms 116 that extend out from near the pivot bearing 114. Multiple actuator arms 116 are typically disposed in vertically spaced relation, with one actuator arm 116 being provided for each major data storage surface of each data storage disk 106 of the disk drive 100. Other types of actuator arm assembly configurations could be utilized as well, an example being an "E" block having one or more rigid actuator arm tips, or the like, that cantilever from a common structure. Movement of the actuator arm assembly 112 is provided by an actuator arm drive assembly, such as a voice coil motor 118 or the like. The voice coil motor 118 is a magnetic assembly that controls the operation of the actuator arm assembly 112 under the direction of control electronics 120.

The control electronics 120 may include a plurality of integrated circuits 122 coupled to a printed circuit board 124. The control electronics 120 may be coupled to the voice coil motor assembly 118, a slider 126, or the spindle motor 110 using interconnects that can include pins, cables, or wires (not shown).

A load beam or suspension 128 is attached to the free end of each actuator arm 116 and cantilevers therefrom. Typically, the suspension 128 is biased generally toward its corresponding data storage disk 106 by a spring-like force. The slider 126 is disposed at or near the free end of each suspension 128. What is commonly referred to as the read/write head (e.g., transducer) is appropriately mounted as a head unit (not shown) under the slider 126 and is used in disk drive read/write operations. The head unit under the slider 126 may utilize various types of read sensor technologies such as anisotropic magnetoresistive (AMR), giant magnetoresistive (GMR), tunneling magnetoresistive (TuMR), other magnetoresistive technologies, or other suitable technologies.

The head unit under the slider 126 is connected to a preamplifier 130, which is interconnected with the control electronics 120 of the disk drive 100 by a flex cable 132 that is typically mounted on the actuator arm assembly 112. Signals are exchanged between the head unit and its corresponding data storage disk 106 for disk drive read/write operations. In this regard, the voice coil motor 118 is utilized to pivot the actuator arm assembly 112 to simultaneously move the slider 126 along a path 134 and across the corresponding data storage disk 106 to position the head unit at the appropriate position on the data storage disk 106 for disk drive read/write operations.

When the disk drive 100 is not in operation, the actuator arm assembly 112 is pivoted to a "parked position" to dispose each slider 126 generally at or beyond a perimeter of its corresponding data storage disk 106, but in any case in vertically spaced relation to its corresponding data storage disk 106. In this regard, the disk drive 100 includes a ramp assembly (not shown) that is disposed beyond a perimeter of the data storage disk 106 to both move the corresponding slider 126 vertically away from its corresponding data storage disk 106 and to also exert somewhat of a retaining force on the actuator arm assembly 112.

Exposed contacts 136 of a drive connector 138 along a side end of the disk drive 100 may be used to provide connectivity between circuitry of the disk drive 100 and a next level of integration such as an interposer, a circuit board, a cable connector, or an electronic assembly. The drive connector 138 may include jumpers (not shown) or switches (not shown) that may be used to configure the disk drive 100 for user specific features or configurations. The jumpers or switches may be recessed and exposed from within the drive connector 138.

It is appreciated that during the manufacturing process, the disk drive 100 may communicate with a ledger. For example, when the integrated circuit 122 is manufactured, a first block of a block chain may be generated, at step 152. It is appreciated that in some embodiments, the generated block may be optionally communicated to a ledger, at step 154. Similarly, when other components of the disk drive 100 are manufactured, their respective blocks are generated and the block chain is updated. More particularly, a second block of the block chain associated with another component of the disk drive 100, e.g., control electronics 120, data storage disk 106, etc., is generated, at step 156, when that component is manufactured. At step 158, the second block of the block chain may optionally be communicated to the ledger. It is appreciated that at step 160, additional blocks of the block chain may be generated, at step 160, for other components of the disk drive 100 being manufactured, e.g., actuator arm assembly 112, the control electronics 120, the voice coil motor assembly 118, the slider 126, the spindle motor 110, etc., and the additional blocks of the block chain may optionally be communicated to the ledger.

In other words, a block of a block chain is generated each time a component for the disk drive 100 is manufactured and the generated block may be communicated from the disk drive 100 to the ledger. Thus, the origin and authenticity of each component and the disk drive as a whole may be verified and determined as reflected through their corresponding blocks within the block chain. In some applications, a customer may recycle the disk drive 100. After the disk drive 100 is recycled, the origin and authenticity of the drive can be verified even after the drive ends up in the gray market using the block chain. It is appreciated that the authenticity of various components may similarly be verified for other storage devices, e.g., solid state drive, or even other electronic devices. It is further appreciated that the verification of authenticity is equally applicable to software components, e.g., firmware.

Figure 2:
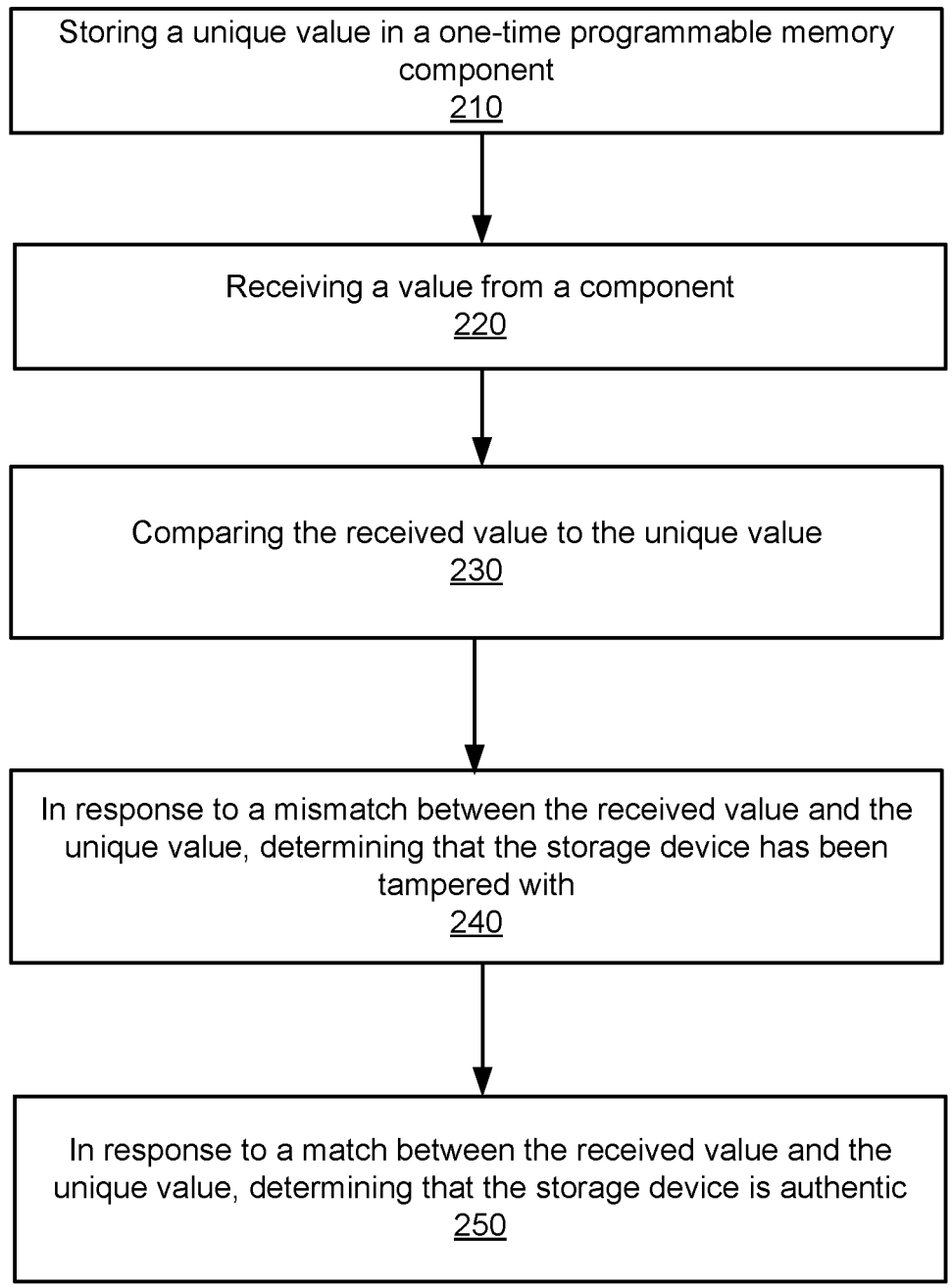
FIG. 2 shows a method of authenticating a storage device according to one aspect of the present embodiments.

Referring now to FIG. 2, a method of authenticating a storage device according to one aspect of the present embodiments is shown. At step 210, a unique value may be stored in a one-time programmable memory component, e.g., a DRAM, an SRAM, etc. In some embodiments, the one-time programmable memory component may reside within the controller of the disk drive 100. It is appreciated that the unique value may be signed or encrypted using an internal private key which can be validated using a public key. For example, the unique value stored on a DRAM may be signed and the DRAM's physical unclonable function (PUF) can be used to ensure that the device has not been tampered with.

It is appreciated that the unique value may be provided by a manufacturer of the one-time programmable memory component, e.g., DRAM vendor, SRAM vendor, etc. In some embodiments, the unique value may be remnant value on the one-time programmable memory, e.g., SRAM, DRAM, etc., at boot up during manufacturing. It is further appreciated that in some embodiments the unique value may be the access time to the one-time programmable memory, e.g., DRAM, SRAM, etc., after it is manufactured.

At step 220, a value is received from a component. The value is received after the manufacturing process and when the storage device is in use. In some embodiments, the value is received during boot up of the storage device. It is appreciated that the component is allegedly the same as the one-time programmable memory, if the device is not tampered with. However, the device may have been tampered with, e.g., DRAM may be emulated using a DDR protocol and to ASIC it appears the same as a DRAM where in fact it is not.

At step 230, the received value is compared to the unique value. At step 240, in response to determining that there is a mismatch between the received value and the unique value, it is determined that the storage device has been tampered with. For example, there may be a mismatch because the access time may be different when a DDR protocol is used as opposed to a DRAM or SRAM, etc. Similarly, there may be a mismatch when an unauthentic components are used, e.g., a different DRAM, a different SRAM, etc., from the original storage device. At step 250, in response to a match between the unique value and the received value, it is determined that the storage device is authentic.

It is appreciated that the method described above may be used to determine whether the storage device has been tampered with for warranty purposes, etc. Furthermore, it is appreciated that the embodiments described herein may be used to determine whether the device, e.g., storage device, IOT device, etc., is authentic and whether authentic data should be transmitted.

Figure 3:
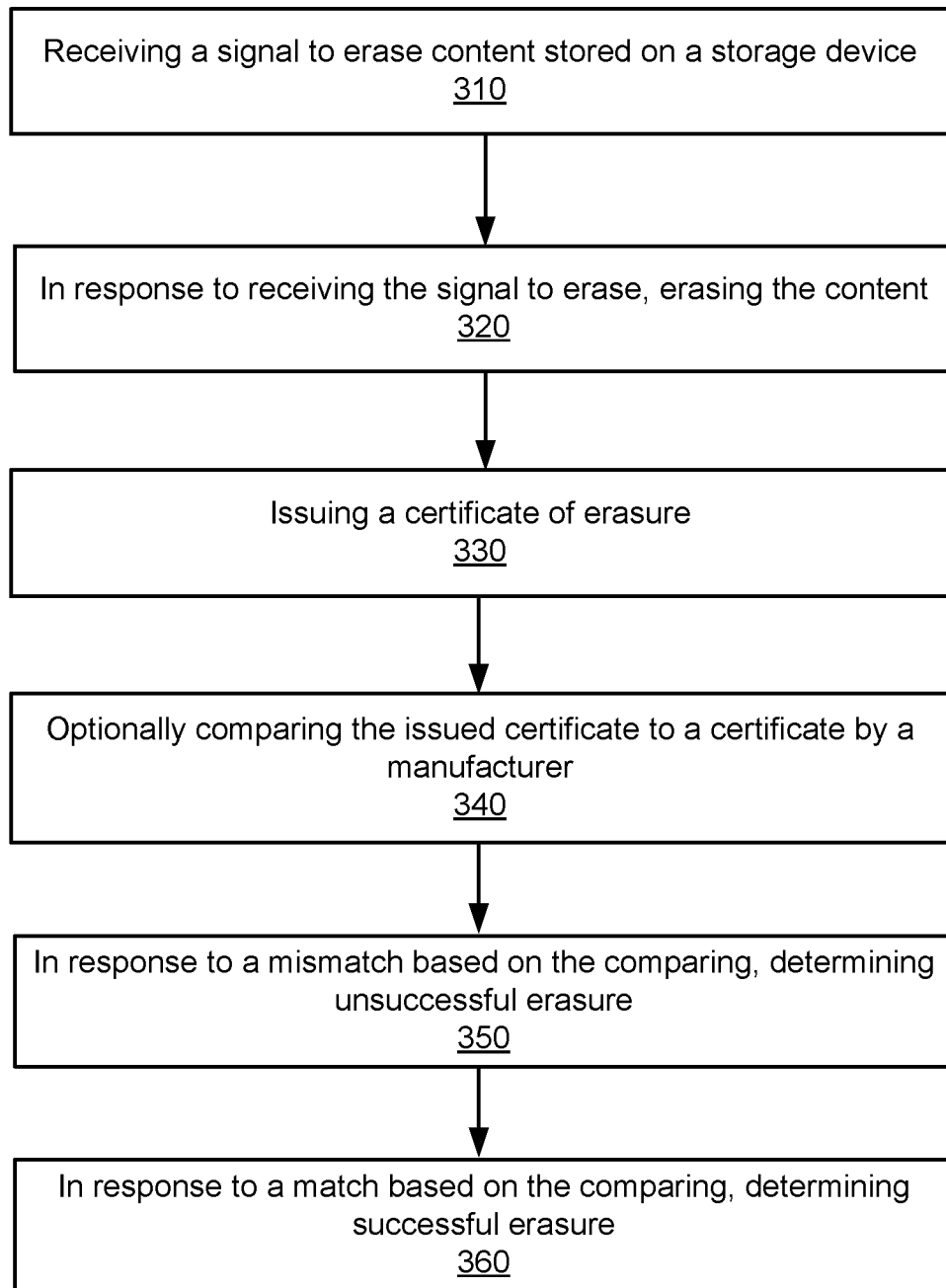
FIG. 3 shows a method of erasing content from a storage device and confirmation thereof according to one aspect of the present embodiments.

Referring now to FIG. 3, a method of erasing content from a storage device and confirmation thereof according to one aspect of the present embodiments is shown. Once the device, e.g., storage device, a smart phone, etc., is manufactured, an authorized user may wish to erase the content for various reasons, e.g., data being compromised, in military applications, under certain stringent regulations regarding personally identifiable information, recycling the device, etc. At step 310, a signal is received indicating that a content or a portion thereof is to be erased. At step 320, in response to receiving a signal indicating that the content is to be erased, erasing the content. At step 330, in response to erasing the content, the device may generate and issue a certificate of erasure. For example, in a storage device, a root key for the storage device may be used to generate and issue a certificate indicating that the content was successfully erased. It is appreciated that in some embodiments, other keys stored on the device may be used to generate and issue the certificate.

In some embodiments, at step 340, the issued certificate may optionally be compared to a certificate issued by the manufacturer of the device. At step 350, in response to a mismatch between the issued certificate and a certificate issued by the manufacturer of the device, it is determined that the erasure of the content has failed. In contrast, at step 360, in response to a match between the issued certificate and the certificate issued by the manufacturer of the device indicates successful erasure of the content.

For example, in some embodiments, the manufacturer of the device may publicly render all certificates on its website where each certificate is unique to a particular device. As such, comparing the issued certificate by the device to the published certificates by the manufacturer and a match between the two confirms the authenticity of the issued certificate as well as the confirmation that the content has been successfully erased. It is appreciated that in some embodiments, the issued certificate by the storage device, e.g., hard drive, solid state drive, etc., may include a time stamp indicating when the content is erased.

Figure 4:
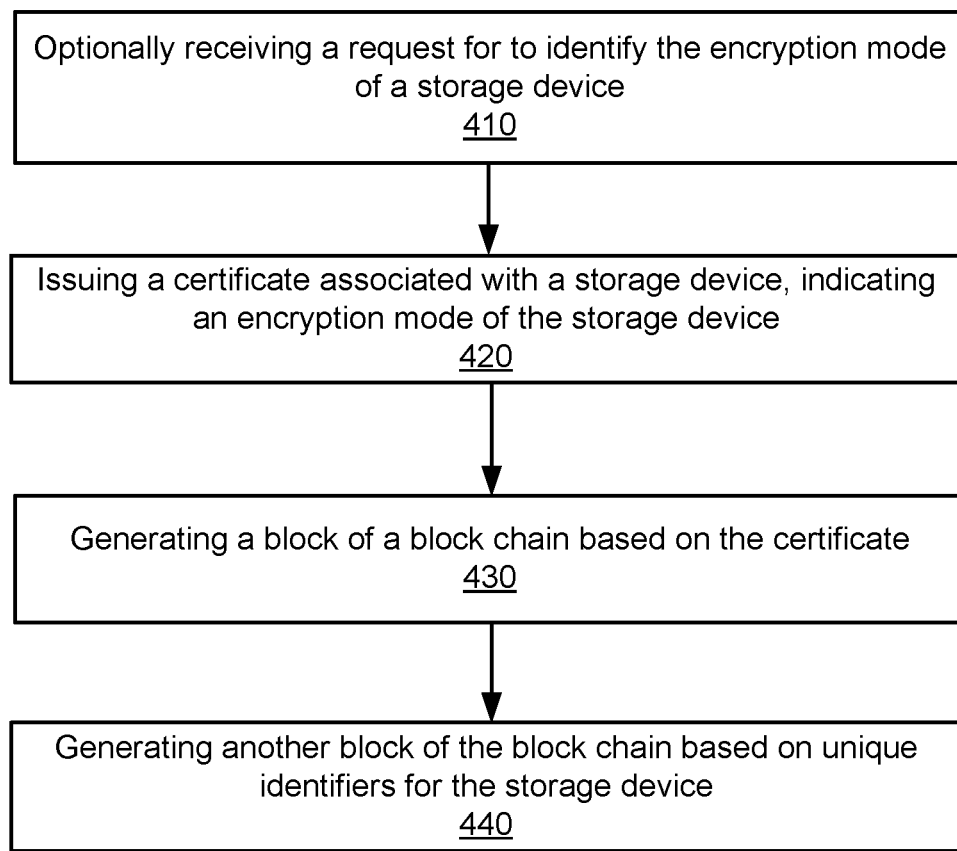
FIG. 4 shows an exemplary method of determining a service mode of operation in a storage device according to one aspect of the present embodiments.

Referring now to FIG. 4, an exemplary method of determining a service mode of operation in a storage device according to one aspect of the present embodiments is shown. Privacy regulations among others may require the device, e.g., storage device, to operate in a particular mode, e.g., SED, FIPS, etc. Operating in a particular mode, ensures functionality of the device in accordance with certain specifications and in accordance with some rules and regulations. As such, at step 410, a request to identify the encryption mode of the storage device may optionally be received. It is appreciated, that at step 420, a certificate may be issued where the certificate is associated with the storage device. It is appreciated that the certificate may be issued using a key unique to the storage device, e.g., root key, etc.

The certificate may identify and indicate the encryption mode of the storage device. At step 430, the issued certificate is used to generate a block within a block chain. It is appreciated that at step 440, additional blocks for the block chain may be generated based on other attributes associated with the storage device, e.g., unique identifier, model number, serial number, etc.

As such, the block chain may be used to verify the mode of operation for any given storage device. It is appreciated that in some embodiments, the certificate may further include information associated with the locking mechanism of the storage device for limiting access to the storage device and content thereof. It is further appreciated that in some embodiments, the certificate may include a time stamp. For example, the time stamp may indicate the mode of operation when the certificate is issued. It is appreciated that blocks associated with the storage device may be included as part of the block chain that is a common block chain ledger for all storage devices.

Figure 5:
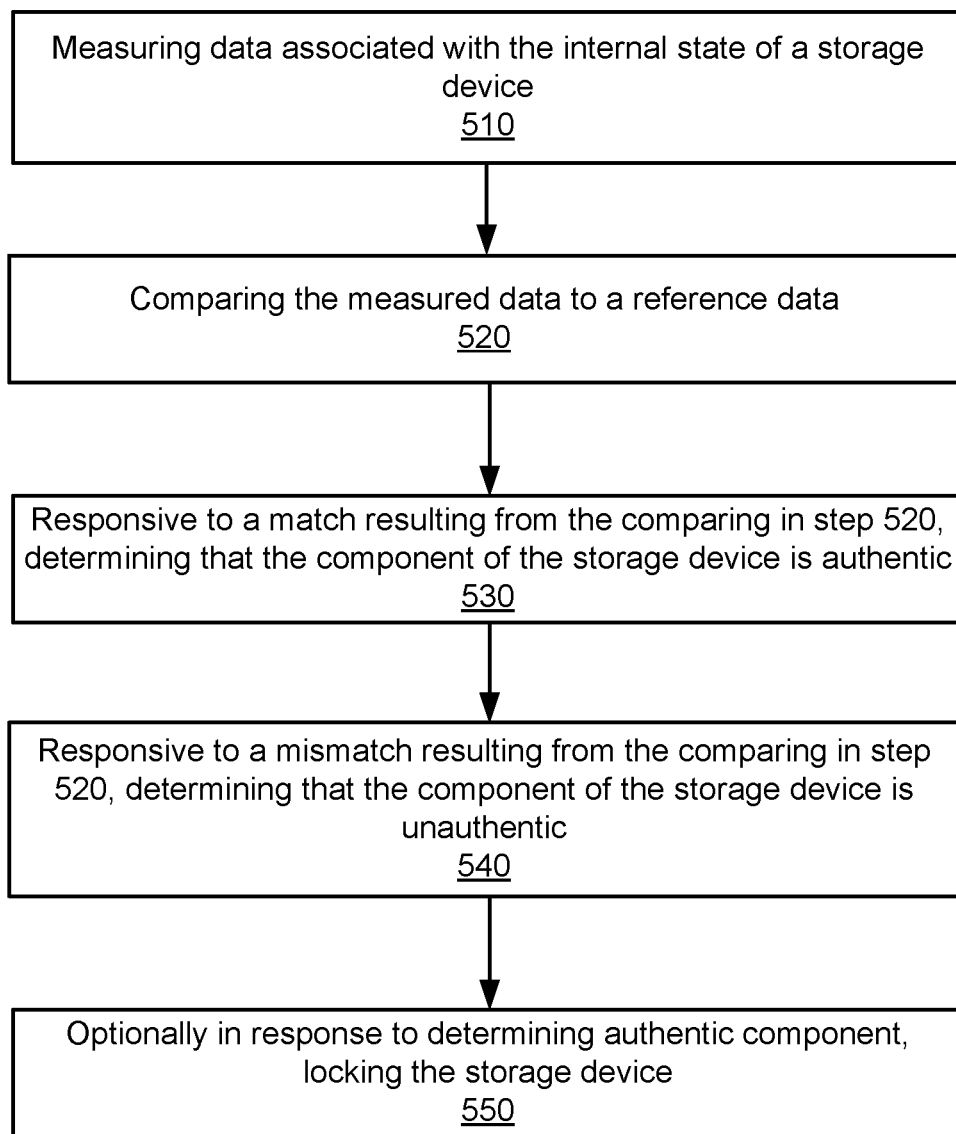
FIG. 5 shows an illustrative method for ensuring authentic component for a storage device according to one aspect of the present embodiments.

Referring now to FIG. 5, an illustrative method for ensuring authentic component for a storage device according to one aspect of the present embodiments is shown. It is appreciated that in some application, especially security related, it may be important to ensure that the device, e.g., storage device, has not been tampered with and that all hardware components and/or software components used are the latest versions, as approved by the manufacturer of the device.

At step 510, data associated with one or more internal states of a storage device may be measured. The internal state for example may be associated with a particular component of the storage device, e.g., hardware components, ROM, software, firmware, etc. In some embodiments, the internal states of the storage device may be measured during the boot up process of the storage device. It is appreciated that measuring the internal state may occur periodically and it may be programmable or it may be in response to a user demand. At step 520, the measured internal state of the storage device may be compared to a reference data, that may be known apriori and that are known to be include authentic values. At step 530, in response to a mismatch between the measured internal state and the reference data, it is determined that a component, e.g., one or more components, of the storage device is not authentic. At step 540, in response to a match between the measured internal state and the reference data, it is determined that a component, e.g., one or more components, of the storage device is autunitic. At step 550, the storage device may optionally be locked in response to determining that the component, e.g., one or more components, of the storage device is unauthentic. Locking the storage device may therefore render the storage device inaccessible, thereby safekeeping the content stored thereon from unauthorized access.

While the embodiments have been described and/or illustrated by means of particular examples, and while these embodiments and/or examples have been described in considerable detail, it is not the intention of the Applicants to restrict or in any way limit the scope of the embodiments to such detail. Additional adaptations and/or modifications of the embodiments may readily appear, and, in its broader aspects, the embodiments may encompass these adaptations and/or modifications. Accordingly, departures may be made from the foregoing embodiments and/or examples without departing from the scope of the concepts described herein. The implementations described above and other implementations are within the scope of the following claims.

What is claimed is:

1. A method comprising:
generating a first block of a block chain, the first block associated with a first component of a storage device, the first block generated when the first component is manufactured;
generating a second block of the block chain, the second block associated with a second component of the storage device, the second block generated when the second component is manufactured;
using the storage device to communicate, via a network, the first and second blocks to a server which appends the first and second blocks to a block chain ledger;
configuring a non-volatile memory (NVM) of the storage device with a desired configuration to store user data from a host device; and
appending a third block to the block chain ledger, the third block comprising a certificate indicative of the desired configuration of the NVM.

2. The method as described in claim 1, wherein the desired configuration of the NVM comprises operation of the NVM in accordance with a selected security protocol, and the certificate comprises a unique value associated with the storage device.

3. The method as described in claim 2, wherein the selected security protocol comprises at least a selected one of self-encrypted drive (SED) standard or federal information processing standard (FIPS).

4. The method as described in claim 1, wherein the desired configuration of the NVM comprises a secure erasure of the NVM, and the certificate is issued by the storage device after successful conclusion of the secure erasure.

5. The method as described in claim 4, further comprising comparing the certificate issued by the storage device with a separate certificate issued by a manufacturer of the storage device to verify successful secure erasure of the NVM.

6. The method as described in claim 1 further comprising:
verifying an origin of the first component of the storage device using the block chain.

7. The method as described in claim 1, wherein the first component is a hardware component.

8. The method as described in claim 7, wherein the second component is a software component.

9. The method as described in claim 1, wherein at least the first or second component comprises firmware loaded to a local memory of the storage device, and wherein operation of the storage device comprises verifying a correct version of the firmware is loaded to the local memory prior to authorizing a transfer of data between the NVM and the host device using the ledger block chain.

10. The method as described in claim 1, wherein the storage device is a solid state drive (SSD) or a hard disc drive (HDD).

11. A method comprising:
manufacturing a data storage device by assembling a plurality of components, the data storage device comprising a controller circuit and a non-volatile memory (NVM);
generating, by the controller circuit, blocks of a block chain to identify an origin and authenticity of each of the plurality of components;
transferring, via the controller circuit using a network, the blocks of the block chain for incorporation into a block chain ledger at a remote server;

issuing, by the controller circuit to the remote server, a certificate responsive to an applied configuration of the NVM;

using the remote server to append the certificate to the block chain ledger; and operating the storage device to transfer data between the NVM and a host device responsive to the applied configuration of the NVM and responsive to verification thereof using the block chain ledger.

12. The method as described in claim 11, wherein the applied configuration of the NVM comprises a secure erasure of content previously written to the NVM performed by:

receiving a signal to erase the content;
erasing the content responsive to the received signal;
issuing the certificate as a first certificate of erasure;
comparing the first certificate of erasure to a second certificate of erasure issued by an entity that performed the manufacturing of the storage device; and
verifying the secure erasure was successful responsive to a match between the first certificate of erasure and the second certificate of erasure.

13. The method as described in claim 11, wherein the applied configuration of the NVM comprises operation of the NVM in accordance with a selected data encryption mode, performed by:

implementing the selected data encryption mode;
issuing the certificate as a certificate of encryption mode;
generating a certificate-based block for the block chain based on the certificate of encryption mode;
generating a confirmation-based block for the block chain based on a unique identifier associated with the storage device; and
forwarding, by the controller circuit to the remote server, the certificate-based block and the confirmation-based block for addition to the block chain ledger.

14. The method as described in claim 11, further comprising disabling operations to transfer data between the NVM and the host device responsive to a mismatch between data incorporated into the block chain ledger and data associated with the host device.

15. A system, comprising a data storage device and a remote server coupled to the data storage device via a network, the data storage device comprising a controller circuit and a non-volatile memory (NVM), the remote server configured to receive blocks of a block chain from the controller circuit responsive to components installed into the data storage device during manufacture thereof and to append the blocks to a block chain ledger, the remote server further configured to subsequently receive a certificate-based block from the controller circuit comprising a certificate indicative of a configuration state of the NVM and to append the certificate-based block to the block chain ledger, the remote server further configured to issue an authorization to the data storage device to authorize data transfers between the NVM and a host device coupled to the data storage device responsive to an analysis of the block chain ledger.

16. The system of claim 15, wherein the configuration state of the NVM comprises a secure erasure of the NVM by the controller circuit to remove content previously stored to the NVM.

17. The system of claim 15, wherein the configuration state of the NVM comprises an encryption mode used by the controller circuit to encrypt data stored to the NVM.

18. The system of claim 15, wherein the remote server is associated with a manufacturing entity which manufactures the data storage device, and the block chain ledger comprises blocks from each of a population of nominally identical data storage devices manufactured by the manufacturing entity.

* * * * *